(12) United States Patent
Erikson

(10) Patent No.: US 7,891,558 B2
(45) Date of Patent: Feb. 22, 2011

(54) OBTAINING TRANSACTION ACCOUNTS USING IDENTIFICATION CARDS

(75) Inventor: Glade Erikson, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 12/715,249

(22) Filed: Mar. 1, 2010

(65) Prior Publication Data

US 2010/0155468 A1 Jun. 24, 2010

Related U.S. Application Data

(63) Continuation of application No. 11/278,629, filed on Apr. 4, 2006, now Pat. No. 7,669,758.

(51) Int. Cl.
*G06K 5/00* (2006.01)
(52) U.S. Cl. .................. 235/380; 235/379; 235/382
(58) Field of Classification Search .............. 235/380, 235/382, 379, 375
See application file for complete search history.

(56) References Cited

U.S. PATENT DOCUMENTS

| | | | |
|---|---|---|---|
| 4,579,371 A | 4/1986 | Long et al. | |
| 5,519,260 A | 5/1996 | Washington | |
| 6,021,400 A * | 2/2000 | Gallacher et al. | 705/43 |
| 6,697,472 B1 | 2/2004 | Jordan et al. | |
| 7,669,758 B2 * | 3/2010 | Erikson | 235/380 |
| 2001/0034717 A1 | 10/2001 | Whitworth | |
| 2002/0104878 A1 | 8/2002 | Seifert et al. | |
| 2002/0153414 A1 | 10/2002 | Stoutenburg et al. | |
| 2002/0156683 A1 | 10/2002 | Stoutenburg et al. | |
| 2002/0166891 A1 | 11/2002 | Stoutenburg et al. | |
| 2002/0169719 A1 | 11/2002 | Dively et al. | |
| 2002/0178025 A1 | 11/2002 | Hansen et al. | |
| 2003/0024979 A1 | 2/2003 | Hansen et al. | |
| 2003/0069856 A1 | 4/2003 | Seifert et al. | |

(Continued)

FOREIGN PATENT DOCUMENTS

CA 2391097 A1 1/2004

(Continued)

OTHER PUBLICATIONS

Office Action dated Apr. 2, 2009 in U.S. Appl. No. 11/278,629.

(Continued)

*Primary Examiner*—Karl D Frech
(74) *Attorney, Agent, or Firm*—Snell & Wilmer L.L.P.

(57) ABSTRACT

A system, method, and computer program product are used to obtain a transaction account. The system comprises at least one input device, at least one credit requesting system, at least one transaction account provider, and at least one credit reporting agency. The input device receives an identification card (e.g., driver's license) and possibly additional information from an individual. The data is then used to automatically generate a transaction account application. The transaction account provider receives and evaluates the transaction account application. The credit requesting system is coupled to the transaction account provider and the at least one input device. The credit requesting system controls transmission of the transaction account application to the transaction account provider and receives the evaluation result from the transaction account provider.

20 Claims, 3 Drawing Sheets

U.S. PATENT DOCUMENTS

| | | |
|---|---|---|
| 2003/0111529 A1 | 6/2003 | Templeton et al. |
| 2003/0126067 A1 | 7/2003 | Seifert et al. |
| 2003/0126083 A1 | 7/2003 | Seifert et al. |
| 2003/0130940 A1 | 7/2003 | Hansen et al. |
| 2003/0163417 A1 | 8/2003 | Cachey et al. |
| 2003/0177067 A1 | 9/2003 | Cowell et al. |
| 2003/0220878 A1 | 11/2003 | Degen et al. |
| 2003/0222135 A1 | 12/2003 | Stoutenburg et al. |
| 2003/0229541 A1 | 12/2003 | Randall et al. |
| 2003/0229580 A1* | 12/2003 | Gass et al. .................... 705/38 |
| 2004/0030647 A1 | 2/2004 | Hansen et al. |
| 2004/0159699 A1 | 8/2004 | Nelson et al. |
| 2004/0177014 A1 | 9/2004 | Cowell |
| 2004/0204788 A1 | 10/2004 | Liberty et al. |
| 2004/0204789 A1 | 10/2004 | Provost et al. |
| 2004/0210476 A1 | 10/2004 | Blair et al. |
| 2004/0215557 A1 | 10/2004 | Michelsen |
| 2004/0215574 A1 | 10/2004 | Michelsen et al. |
| 2004/0230527 A1 | 11/2004 | Hansen et al. |
| 2005/0017067 A1 | 1/2005 | Seifert et al. |
| 2005/0091133 A1 | 4/2005 | Ballman |
| 2005/0119968 A1 | 6/2005 | Michelsen et al. |
| 2005/0167481 A1 | 8/2005 | Hansen et al. |
| 2005/0192895 A1 | 9/2005 | Rogers et al. |
| 2005/0192897 A1 | 9/2005 | Rogers et al. |
| 2005/0211763 A1 | 9/2005 | Sgambati et al. |
| 2005/0261996 A1 | 11/2005 | Provost et al. |
| 2006/0005192 A1 | 1/2006 | Prendergast et al. |
| 2006/0036496 A1 | 2/2006 | Cowell et al. |
| 2006/0074803 A1 | 4/2006 | Crowell et al. |
| 2006/0085335 A1 | 4/2006 | Crawford et al. |
| 2006/0247991 A1 | 11/2006 | Jin et al. |

FOREIGN PATENT DOCUMENTS

| | | |
|---|---|---|
| DE | 10109126 A1 | 10/2002 |
| FR | 2801262 A1 | 5/2001 |
| JP | 2-3559 A | 1/1990 |
| JP | 2000-33851 A | 2/2000 |
| TW | 588290 | 5/2004 |
| WO | WO 93/19942 A1 | 10/1993 |
| WO | WO 96/11458 A1 | 4/1996 |
| WO | WO 01/93503 A2 | 12/2001 |
| WO | WO 2005/038600 A2 | 4/2005 |

OTHER PUBLICATIONS

Notice of Allowance dated Oct. 29, 2009 in U.S. Appl. No. 11/278,629.

English abstract for German Patent Publication No. DE10109126, 1 page.

English abstract for French Patent Publication No. FR2801262, 1 page.

English abstract for Japanese Patent Publication No. JP2003559, 1 page.

English abstract for German Patent Publication No. JP2000033851, 1 page.

English abstract for German Patent Publication No. TW588290B, 1 page.

*Card Scanning: IDScan supports states*, from http://www.card-scanner.com/id-scan-license.html, 2 pages, printed Nov. 10, 2005.

*Early Warning® Services: Identity Authentication and Risk Assessment*, First Data Corporation, 14 pages, Copyright 2005.

*ID Validation—At a Glance*, Primary Payment Systems, Inc., 1 page, Aug. 2005.

*IDLogix® Service: Credential Validation Detecting Invalid and Counterfeit IDs*, Primary Payment Systems, Inc., 13 pages, Copyright 2004.

Quinn, M., "GE Tests License Readers for In-Store Applications," *American Banker*, p. 5, Dec. 30, 2005.

International Search Report and Written Opinion, mailed Sep. 24, 2007, for International Application No. PCT/US07/07531, 8 pgs.

* cited by examiner

OBTAINING TRANSACTION ACCOUNTS USING IDENTIFICATION CARDS

CROSS-REFERENCE TO RELATED APPLICATIONS

This application is a continuation of, and claims priority to, U.S. Ser. No. 11/278,629 entitled "OBTAINING TRANSACTION ACOCUNTS USING IDENTIFICATION CARDS" filed on Apr. 4, 2006. The '629 application is incorporated by reference herein in its entirety.

BACKGROUND

1. Field of the Invention

The present invention generally relates to applying for and obtaining transaction accounts, and more particularly to using an identification card to obtain such transaction accounts.

2. Related Art

There are currently several methods of obtaining a transaction account. Many credit-offering companies send out mass mailings of "pre-approved" applications to prospective customers. Those who receive such mailings and are interested in obtaining a transaction account fill out the written application and mail it back for processing. As another example, when a customer is making a purchase at a store, often the sales clerk will inquire whether the customer is interested in applying for a transaction account, sometimes offering some sort of immediate discount for doing so. If so, the customer either manually fills out a paper application with his or her personal information, or in some cases verbally provides the necessary information to the sales clerk, who then keys the information into a computer terminal.

There are several disadvantages to this latter method of applying for a transaction account. It is time consuming and can be somewhat annoying for the customer to manually fill out the paper application while standing in a store. The applications are typically small and hard to read, having little space for the necessary information. In some instances, a customer might sloppily complete the application, hand it to the sales clerk, and then the clerk has to ask the consumer to verbally provide the needed information because some if it might be illegible. This is a further waste of time. A more substantial disadvantage is the possibility of identity theft.

In this age of identity theft and credit fraud, consumers are more protective than ever of their personal information. When applying for transaction accounts, consumers are very wary of having to supply and submit any personal information. This is even more prevalent when the application for credit is done in a public place, such as in a store or other point-of-sale area.

Given the foregoing, what is needed is a system, method and computer program product for automatically applying for a transaction account with the use of an identification card.

SUMMARY OF THE INVENTION

The present invention meets the above-identified needs by providing a system, method and computer program product for automatically completing a transaction account application with the use of a consumer's identification card.

The present invention provides a system and method in which a consumer's identification card is received by a customer service representative. The identification card is then scanned by a card reading device, whereby the format of the identification card is validated. The consumer's personal information is then automatically imported from the identification card into the transaction account application. The information is then used to complete the application, and the application is transmitted to a transaction account provider. The transaction account provider processes the application and then transmits a decision back to the customer service representative.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number identifies the drawing in which the reference number first appears.

DETAILED DESCRIPTION

Figure 1:
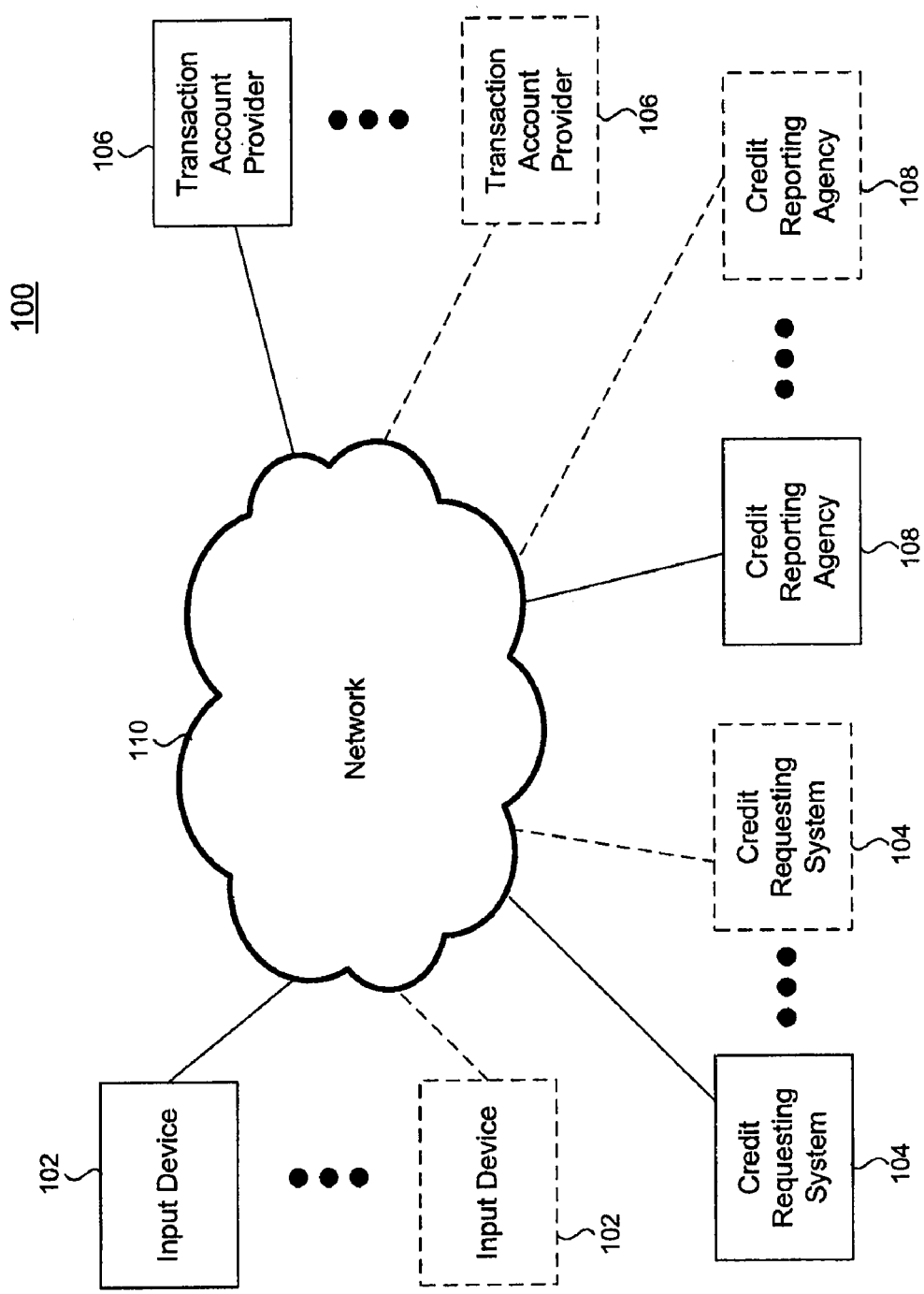
FIG. 1 is a system diagram, according to one embodiment of the present invention.

The present invention is directed to a system, method and computer program product for obtaining a transaction account with the use of a consumer's identification card.

The present invention is now described in more detail herein in terms of the above exemplary description. This is for convenience only and is not intended to limit the application of the present invention. In fact, after reading the following description, it will be apparent to one skilled in the relevant art(s) how to implement the following invention in alternative embodiments.

Terminology

The terms "user," "consumer", "customer," etc., and/or the plural form of these terms are used interchangeably throughout herein to refer to those persons or entities capable of accessing, using, being affected by and/or benefiting from the tool that the present invention provides for obtaining transaction accounts using a consumer's identification card.

The terms "business", "customer service representative", or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The term "transaction account provider" or the plural form of this term is used throughout herein to refer to any business entity that is engaged in the business of providing transaction card accounts or the like. Currently, there are a variety of such entities, such as American Express, but the present invention is not limited to any particular such entity.

The term "transaction card" as used herein may include any type of open or closed charge card, credit card, debit card, stored value card, an RFID chip based card or token, and the like.

RFID and Transmission of Magnetic Stripe Data

It should be noted that the transfer of information in accordance with the present invention may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

Databases

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

System Overview

FIG. 1 shows a system 100, according to one embodiment of the present invention.

System 100 includes an input device 102, a credit requesting system 104, a transaction account provider 106, and a credit reporting agency 108. In one embodiment, devices 102, 104, 106, and 108 are coupled via a network 110, while in other embodiments they can be directly linked. Network 110 can be a wired or wireless local or distributed system which can utilize the Internet, an intranet, an extranet, or the like, or any similar or analogous communication system as would be known to persons skilled in the relevant art.

In one example, input device 102 comprises one or more devices that allow for capturing personal information from an identification card (e.g., driver's license) and, if necessary, additional information associated with a consumer. For example, input device 102 can be, but is not limited to, a card reader, a bar code reader, a keyboard, a touch screen, a kiosk, a voice recognition system, or any other system that allows for this functionality. In one example, input device 102 can be located at a merchant's location, for example, a supermarket, warehouse store, electronics store, point-of-sale terminal, or the like. In various examples, the additional information can be Social Security number (or partial Social Security number, as discussed in co-owned U.S. patent application Ser. No. 11/236,822, filed Sep. 28, 2005, which is incorporated herein by reference) employer, creditor's names, monthly debt payments, or any other information that can be used along with the information scanned from the identification card to uniquely identify the consumer to transaction account provider 106.

In one example, there may be more than one input device 102, transaction account requesting system 104, transaction account provider 106, and credit reporting agency 108, coupled together either directly or via optional network 110. This can be when several point-of-sale (or point-of-credit application) devices (e.g., input devices 102) send information about several requesting individuals to more than one transaction account provider (e.g., transaction account providers 106) from either the same merchant or different merchants. The transaction account providers might request credit reports from one or more credit reporting agencies 108, by way of one or more credit requesting systems 104.

In one example, the personal information and the comparison result can be encrypted or otherwise secured during transmission.

Process Overview

Figure 2:
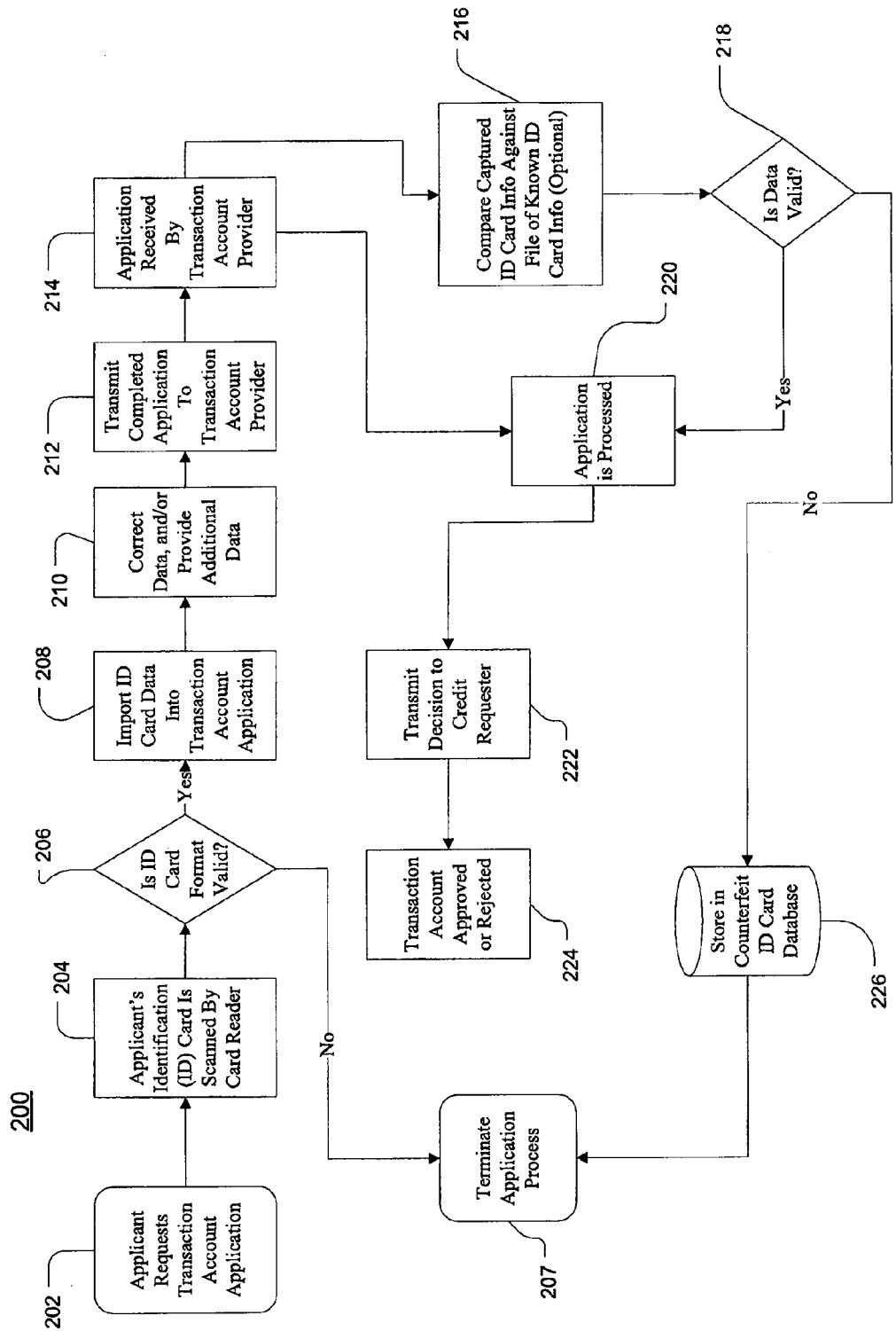
FIG. 2 is a flowchart illustrating various processes, according to one or more embodiments of the present invention.

FIG. 2 shows a flowchart illustrating a process 200, according to one embodiment of the present invention. Process 200 begins at step 202, at which a consumer requests a transaction account application. In step 204, the consumer provides his or her identification card, which is then scanned by an input device, such as a card reader. An example of a card reader could be one such as the idScan, described at http://www.card-scanner.com/id-scan-license.html. In step 206, the input device determines the validity of the identification card. If the identification card is not validated, the application process is terminated at step 207. If the card is determined to be valid, at step 208, the transaction account application is automatically populated with data scanned from the identification card. In step 210, the consumer reviews the application for correctness. Although not always required, the consumer may also provide additional information at this step. The additional information can be a Social Security number (or partial Social Security number, as discussed in above-referenced U.S. patent application Ser. No. 11/236,822), employer, creditor's names, monthly debt payments, or any other information that can be used along with the information scanned from the identification card to uniquely identify the consumer and determine the consumer's creditworthiness. In step 212, the transaction account application is transmitted to the transaction account provider.

In step 214, the transaction account provider receives the application. At this point, optional step 216 may begin. In optional step 216, the information captured from the identification card is compared to a database of known identification card information. If a match is found, the information is compared to further determine the validity of the identification card, as shown in step 218. If the information does not match correctly, then it is possible that the identification card is counterfeit. If a card is determined to be invalid or counterfeit, its data is stored in a database of counterfeit cards, as shown in step 226. The application process is then terminated at step 207.

If the card is determined to be valid, the process moves on to step 220, where the transaction account application is processed. Typically, the transaction account provider will transmit the consumer's data to a credit reporting agency to obtain the consumer's credit report. The credit reporting agency can be any established credit reporting agency or bureau (e.g., TransUnion, Equifax and Experian), or any credit reporting agency now operating or established in the future.

If there is a match of the consumer's data in the credit reporting agency's records, a credit report is transmitted to the transaction account provider. The credit report is then used in the decision to approve or deny the transaction account application. In step 222, the result of the decision is transmitted back to the credit requester (e.g., the store merchant), and the transaction account is then either approved or rejected in step 224.

Example Implementations

The present invention (i.e., system 100, process 200, or any part(s) or function(s) thereof) may be implemented using hardware, software or a combination thereof and may be implemented in one or more computer systems or other processing systems. However, the manipulations performed by the present invention are often referred to in terms, such as receiving or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
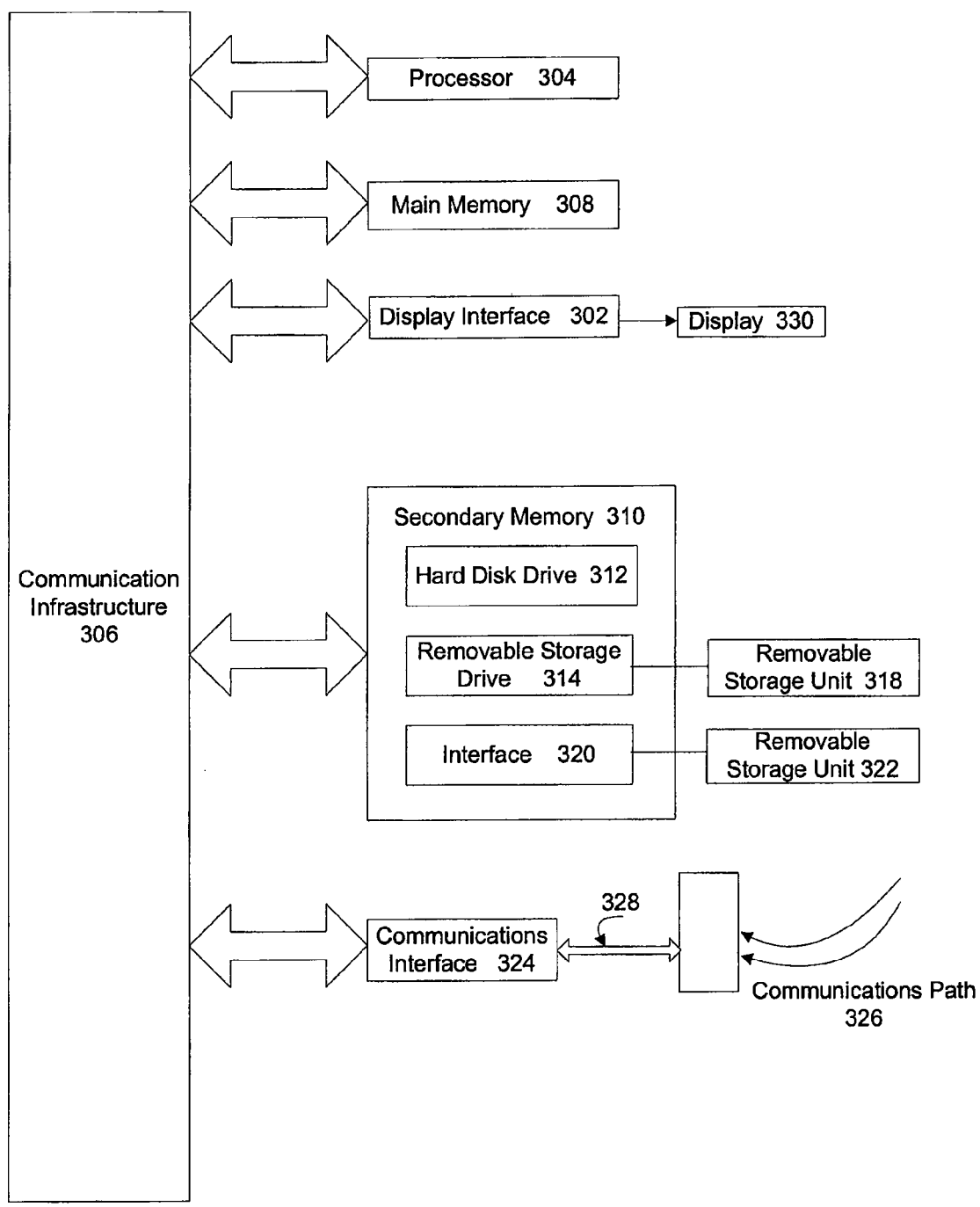
FIG. 3 is a block diagram of a sample computer system that can be used in the implementation of one or more embodiments of the present invention.

In fact, in one embodiment, the invention is directed toward one or more computer systems capable of carrying out the functionality described herein. An example of a computer system 300 is shown in FIG. 3.

The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention, as appropriate in the jurisdiction(s) in which the present invention is implemented). Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
   receiving, at a computer-based system for obtaining transaction account data, captured personal information from an identification instrument used to identify an individual;
   determining, by the computer-based system, validity of the identification instrument;
   populating, by the computer-based system and in response to a valid identification instrument, the personal information into a transaction account application;
   transmitting, by the computer-based system, the populated transaction account application to a transaction account provider, wherein the transaction account provider evaluates the populated transaction account application and produces a result of the evaluation; and
   receiving, by the computer-based system, the result of the evaluation.

2. The method of claim 1, further comprising at least one of correcting the populated transaction account application or providing additional data, by the computer-based system and before the transmitting.

3. The method of claim 1, further comprising providing additional data, by the computer-based system and before the transmitting, wherein the additional data provided comprises at least one of a social security number or a partial social security number.

4. The method of claim 1, wherein the transaction account provider requests a search of a database of a credit reporting agency using the populated transaction account application.

5. The method of claim 1, wherein the determining further comprises comparing the personal information captured from the identification instrument with data stored in a database of known identification instruments.

6. The method of claim 5, further comprising entering the identification instrument into a database of counterfeit identification instruments in response to the comparing indicating the identification instrument is invalid.

7. The method of claim 1, wherein the receiving, the determining, the populating, the transmitting, and the receiving are performed in at least one of a public place, a store, and a point-of-sale area.

8. The method of claim 1, wherein the receiving the captured personal information from the identification instrument is performed by a card reader.

9. The method of claim 1, wherein the identification instrument is an identification card.

10. A system for obtaining transaction account data, the system comprising:
    a computer network communicating with a memory;
    the memory communicating with a processor; and
    the processor, when executing a computer program, is configured to:
        receive captured personal information from an identification instrument used to identify an individual;
        determine validity of the identification instrument;
        populate, in response to a valid identification instrument, the personal information into a transaction account application;
        transmit the populated transaction account application to a transaction account provider, wherein the transaction account provider evaluates the populated transaction account application and produces a result of the evaluation; and
        receive the result of the evaluation.

11. The system of claim 10, wherein the system includes a card reader configured to receive the captured personal information from the identification instrument.

12. The system of claim 10, wherein the identification instrument is an identification card.

13. A tangible computer-readable medium having non-transitory computer-executable instructions stored thereon that, if executed by a computer-based system for obtaining transaction account data, cause said computer-based system to perform operations comprising:
    receiving, at a computer-based system for obtaining transaction account data, captured personal information from an identification instrument used to identify an individual;
    determining, by the computer-based system, validity of the identification instrument;
    populating, by the computer-based system and in response to a valid identification instrument, the personal information into a transaction account application;
    transmitting, by the computer-based system, the populated transaction account application to a transaction account provider, wherein the transaction account provider evaluates the populated transaction account application and produces a result of the evaluation; and
    receiving, by the computer-based system, the result of the evaluation.

14. The medium of claim 13, further comprising at least one of correcting the populated transaction account application or providing additional data, by the computer-based system and before the transmitting.

15. The medium of claim 13, further comprising providing additional data, by the computer-based system and before the transmitting, wherein the additional data provided comprises at least one of a social security number or a partial social security number.

16. The medium of claim 13, wherein the transaction account provider requests a search of a database of a credit reporting agency using the populated transaction account application.

17. The medium of claim 13, wherein the determining further comprises comparing the personal information captured from the identification instrument with data stored in a database of known identification instruments.

18. The medium of claim 17, further comprising entering the identification instrument into a database of counterfeit identification instruments in response to the comparing indicating the identification instrument is invalid.

19. The medium of claim 13, wherein the receiving the captured personal information from the identification instrument is performed by a card reader.

20. The medium of claim 13, wherein the identification instrument is an identification card.

* * * * *